United States Patent
Bischinger (10) Patent No.: US 10,412,667 B2
(45) Date of Patent: Sep. 10, 2019

(54) METHOD FOR ESTABLISHING A ROAMING CONNECTION

(71) Applicant: DEUTSCHE TELEKOM AG, Bonn (DE)

(72) Inventor: Kurt Bischinger, Vienna (AT)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/066,068

(22) PCT Filed: Dec. 23, 2016

(86) PCT No.: PCT/EP2016/082645
§ 371 (c)(1),
(2) Date: Jun. 26, 2018

(87) PCT Pub. No.: WO2017/114799
PCT Pub. Date: Jul. 6, 2017

(65) Prior Publication Data
US 2018/0376412 A1    Dec. 27, 2018

(30) Foreign Application Priority Data

Dec. 30, 2015   (DE) .................. 10 2015 122 981
Dec. 30, 2015   (EP) ..................... 15203169

(51) Int. Cl.
*H04W 36/00*     (2009.01)
*H04W 48/18*     (2009.01)
*H04W 8/08*     (2009.01)

(52) U.S. Cl.
CPC ............. *H04W 48/18* (2013.01); *H04W 8/08* (2013.01); *H04W 36/00* (2013.01)

(58) Field of Classification Search
CPC ......... H04W 48/18; H04W 8/02; H04W 8/06; H04W 8/18; H04W 60/00; H04W 8/08;
(Continued)

(56) References Cited

U.S. PATENT DOCUMENTS 8,514,828 B1*   8/2013   Verma ................. H04L 12/4633
                                                     370/338
2004/0067735 A1    4/2004   Lobley
(Continued)

FOREIGN PATENT DOCUMENTS

JP           11205342 A      7/1999
WO    WO 2017079906 A1    5/2017

OTHER PUBLICATIONS

"3rd Generation Partnership Project; Technical Specification Group Services and System Aspects; Feasibility Study on New Services and Markets Technology Enablers; Stage 1 (Release 14)", 3GPP Draft; TR22 891-V120-RM, 3rd Generation Partnership Project (3GPP), Mobile Competence Centre; 650, Route Des Lucioles; F-06921 Sophia-Antipolis Cedex; France, Dec. 9, 2015 (Dec. 9, 2015), XP051071179.
(Continued)

*Primary Examiner* — Daniel Lai
(74) *Attorney, Agent, or Firm* — Leydig, Voit & Mayer, Ltd.

(57) ABSTRACT

A method to establish a roaming connection of a communication terminal of a foreign communication network in a visited communication network includes receiving a roaming connection request from the communication terminal of the foreign communication network by a first identification entity of a first sub-network of the visited communication network, the roaming connection request having an identifier of the communication terminal. The method further includes identifying the communication terminal based on the identifier of the communication terminal, receiving a foreign sub-network identifier by the first identification entity of the visited communication network; verifying, on a basis of the foreign sub-network identifier, whether a respective sub-network of the visited communication net-
(Continued)

work corresponds to the foreign sub-network; and sending a configuration request for a configuration of the foreign sub-network.

17 Claims, 5 Drawing Sheets

(58) Field of Classification Search
CPC ....... H04W 36/14; H04W 76/10; H04W 8/20;
H04W 36/0022; H04W 80/10; H04W
88/06; H04W 76/12; H04W 8/205; H04W
36/0016; H04W 48/17; H04W 4/50;
H04W 60/005; H04W 76/27; H04W
92/02; H04W 24/02; H04W 24/04; H04W
36/0011; H04W 36/0066; H04W 36/22;
H04W 40/24; H04W 48/08; H04W 48/14;
H04W 76/15; H04W 8/22; H04W 36/00;
H04W 36/0033; H04W 36/0055; H04W
36/26; H04W 40/02; H04W 40/30; H04W
84/00; H04W 84/02; H04W 88/10; H04W
8/087; H04W 8/14; H04W 8/26; H04W
8/30; H04W 92/12; H04L 65/4007; H04L
41/0893; H04L 12/4641; H04L 5/0053;
H04M 15/8038; H04M 15/8228
See application file for complete search history.

(56) References Cited

U.S. PATENT DOCUMENTS

| | | | |
|---|---|---|---|
| 2005/0276229 A1 | 12/2005 | Torabi | |
| 2008/0002607 A1* | 1/2008 | Nagarajan | H04W 8/087 370/328 |
| 2008/0002642 A1* | 1/2008 | Borkar | H04L 45/16 370/338 |
| 2008/0240041 A1* | 10/2008 | Kim | H04W 36/0011 370/331 |
| 2010/0056148 A1 | 3/2010 | Kellil et al. | |
| 2016/0353281 A1* | 12/2016 | Senarath | H04W 12/06 |
| 2018/0262979 A1 | 9/2018 | Wang et al. | |
| 2018/0295498 A1* | 10/2018 | Neal | H04W 8/12 |
| 2018/0352501 A1* | 12/2018 | Zhang | H04W 48/18 |

OTHER PUBLICATIONS

Deutsche Telekom: "Key issue: 3GPP architecture impacts to support network slicing roaming", 3GPP Draft; S2-153934 Network Slicing Roaming, $3^{rd}$ Generation Partnership Project (3GPP), Mobile Competence Centre; 650, Route Des Lucioles; F-06921 Sophia. Antipolis Cedex; France, Bd. SA WG2, Nr. Anaheim, USA; Nov. 16, 2015-Nov. 20, 2015, Nov. 16, 2015 (Nov. 16, 2015), XP051041140.
3GPP TSG-SA WG1 Meeting #71, S1-153103, "Network Slicing-Roaming", Aug. 17-21, 2015, pp. 1-2.

* cited by examiner

METHOD FOR ESTABLISHING A ROAMING CONNECTION

CROSS REFERENCE TO RELATED APPLICATIONS

This application is a U.S. National Stage Application under 35 U.S.C. § 371 of International Application No. PCT/EP2016/082645 filed on Dec. 23, 2016, and claims benefit to German Patent Application No. DE 10 2015 122 981.1 filed on Dec. 30, 2015 and European Patent Application No. EP 15203169.6 filed on Dec. 30, 2015. The International Application was published in German on Jul. 6, 2017 as WO 2017/114799 A1 under PCT Article 21(2).

FIELD

The invention relates to methods for establishing a roaming connection of a communication terminal of a foreign communication network in a visited network, with both networks having a number of sub-networks, especially in a 5G communication network with multiple slices. The invention further concerns network management entities for establishing such roaming connections.

BACKGROUND

The fifth generation of the mobile technology (5G) concerns the requirement and technical challenges of the future communication networks starting from about 2020 and thereafter. It addresses the needs of a completely mobile and networked society characterized by enormous data traffic growth and inter-linking at multiple levels.

New wireless interfaces are required in 5G in order to fulfill the requirements to the high frequency use, for example, for new applications, such as Internet of things (IoT), and special capabilities, such as short runtimes, which are beyond the capabilities of 4G communication networks. In this process, 5G is treated as an end-to-end system, which contains all network aspects with a design that enables a high degree of convergence. 5G will make full use of the existing access mechanisms and their possible development, including the existing landline access technologies of many other access technologies that are yet to be developed.

5G will be operating in strongly heterogeneous environment, i.e. with multiple types of access technologies, multi-layer networks, different types of communication devices and user interactions etc. The entire range of applications with completely different requirements shall be supported in the best way, such as fail-safe, reliable communication, communication with low data rates or broadband communication in densely populated areas. In such an environment, there is fundamental need for 5G in order to provide seamless and consistent user experience in time and space. A 5G communication network provider needs to adjust the used resources to the respective requirement in an optimal and dynamic way, in order to support a variety of applications at the same time.

SUMMARY

In an embodiment, the present invention provides a method to establish a roaming connection of a communication terminal of a foreign communication network in a visited communication network, the foreign communication network and the visited communication network each comprising multiple sub-networks. An identification entity is assigned in each sub-network of the visited communication network for identification of a communication terminal. A sub-network identifier is assigned to each sub-network of the respective communication network. In the visited communication network, there is a network management entity that manages assignment of sub-networks to communication devices. The method includes receiving a roaming connection request from the communication terminal of the foreign communication network by a first identification entity of the first sub-network of the visited communication network, the roaming connection request having an identifier of the communication terminal. The method further includes identifying the communication terminal by the first identification entity based on the identifier of the communication terminal, receiving a foreign sub-network identifier of a foreign sub-network of the foreign communication network by the first identification entity of the visited communication network; verifying, on a basis of the foreign sub-network identifier by the network management entity or the first identification entity, whether a respective sub-network of the visited communication network corresponds to the foreign sub-network, which is shown by the foreign sub-network identifier; and sending a configuration request for a configuration of the foreign sub-network by the first identification entity or the network management entity of the visited communication network to the foreign communication network if no respective sub-network of the visited communication network corresponds to the foreign sub-network.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION 5G needs, first of all, to improve the communication efficiency, especially higher data throughput, shorter delays, particularly high reliability, a much higher connection density and a larger mobility area, and secondly, increase flexibility of operations and provide customized solutions with minimal use of resources. Such increased efficiency is expected together with the ability to control strongly heterogeneous environments and the ability to ensure trust and to protect identity and private sphere of the user.

Embodiments of the invention increase communication efficiency and flexibility, especially for roaming of a communication terminal, especially in 5G.

The methods and systems presented below may be of different types. Specific described elements can be implemented by hardware or software components, for example, electronic components, which can be produced by various technologies and cover, for example, semiconductor chips, ASICs, microprocessors, digital signal processors, integrated circuits, electro-optical circuits and/or passive components.

The devices, systems and methods presented below are able to transmit information through a communication network. The term communication network or communication net denotes here the technical infrastructure in which the signal transmission takes place. The communication network essentially covers the switching network in which the transmission and switching of signals between the fixed facilities and mobile network platforms take place, and the access network in which the transmission of signals between a network facility and a communication terminal takes place. The communication network can include in this case both components of a mobile network and those of a landline. In mobile networks, the access network is also referred to as air interface, and it covers, for example, a base station (NodeB, eNodeB, radio cell) with a mobile radio antenna in order to establish communication with a communication terminal, such as mobile telephone or smartphone, or a mobile device with a wireless adapter. In landline, access network covers, for example, a DSLAM (digital subscriber line access multiplexer), in order to connect the communication terminals of multiple participant by cord or cable. The communication can be further transmitted into further networks, for example, those of other network providers, such as foreign networks.

Figure 1:
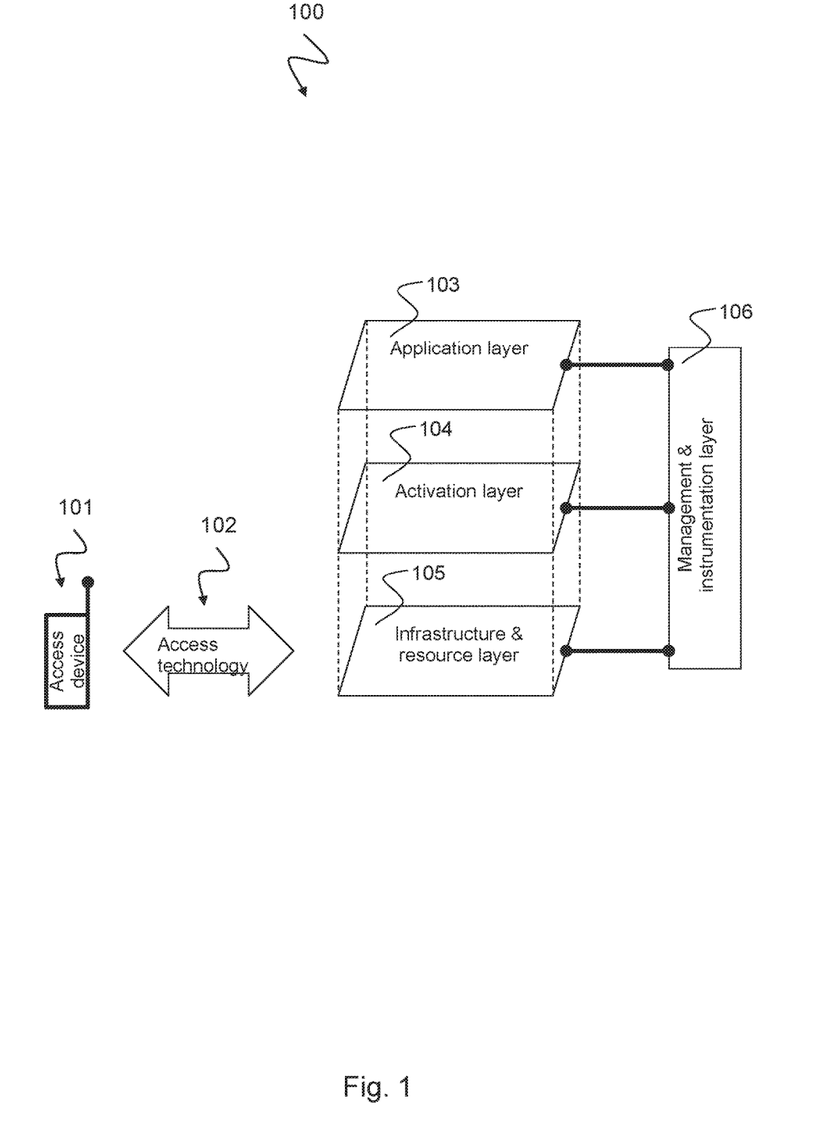
FIG. 1 depicts a scheme of a 5G system architecture 100.

The devices, systems and methods presented below are intended to increase communication in communication networks, especially in those with the 5G system architecture presented below. FIG. 1 shows a scheme of such a 5G system architecture 100. The 5G system architecture 100 covers an area with the 5G communication terminals 101, which are connected via various access technologies 102 with multi-layered communication structure, which covers an infrastructure & resource layer 105, an activation layer 104 and an application layer 103, which are managed via a management & instrumentation layer 106.

The infrastructure & resource layer 105 covers the physical resources of a convergent network structure consisting of landline and mobile network components ("Fixed-Mobile Convergence") with access nodes, cloud nodes (consisting of processing and storage nodes), 5G devices, such as mobile phones, portable devices, CPEs, machine communication modules and other network notes and related links. 5G devices can cover various and configurable abilities and act, for example, as relay or hub, or function as a computer/storage resource, depending upon the respective context. These resources are provided to the higher levels 104, 103 and the management & instrumentation level 106 through the respective APIs (application program interfaces). Control of performance and configuration are inherent parts of such APIs.

The activation layer 104 covers a library of functions, which are required within a convergent network in the form of building blocks of modular architecture. They cover functions, which are implemented by software modules, which can be called from a storage place of the required location, and a set of configuration parameters for certain parts of the network, such as the wireless access. These functions and abilities can be accessed on demand by the management & instrumentation level 106 by means of the APIs provided for this purpose. For certain features, multiple variants can exist, such as different implementations of the same functionality, which have different performance or characteristics. Various degrees of performance and available capabilities can be used to make significantly deeper distinctions between network functionalities than it is possible in the existing networks, for example, to offer as mobility function a nomadic mobility, vehicle mobility or air traffic mobility, depending upon specific needs.

The application layer 103 covers specific applications and services of network providers, the company, the vertical operator or third parties, which use the 5G network. The interface to the management & instrumentation level 106 enables, for example, building certain, i.e. dedicated, network slices for an application or allocating an application to an existing network.

The management & instrumentation level 106 is the contact point where the required use cases are implemented into the actual network functions and slices. It defines the network slices for a given application scenario, ties together the relevant modular network functions, assigns the relevant performance configurations, and maps all the resources for the infrastructure & resource layer 105. The management & instrumentation level 106 also manages scaling of capacities of these functions and their geographical distribution. For specific applications, it can also display capabilities permitting third parties to create and manage their own network slices via APIs. Because of multiple tasks of the management & instrumentation level 106, it is not a monolithic block of functionalities, but rather a collection of modular functions, which integrate the progress made in various network domains, such as NFV (network function virtualization), SDN (software defined networking) or SON (self-organizing networks). The management & instrumentation level 106 uses to this end data supported intelligence to optimize all aspects of service structure and provision.

Figure 2:
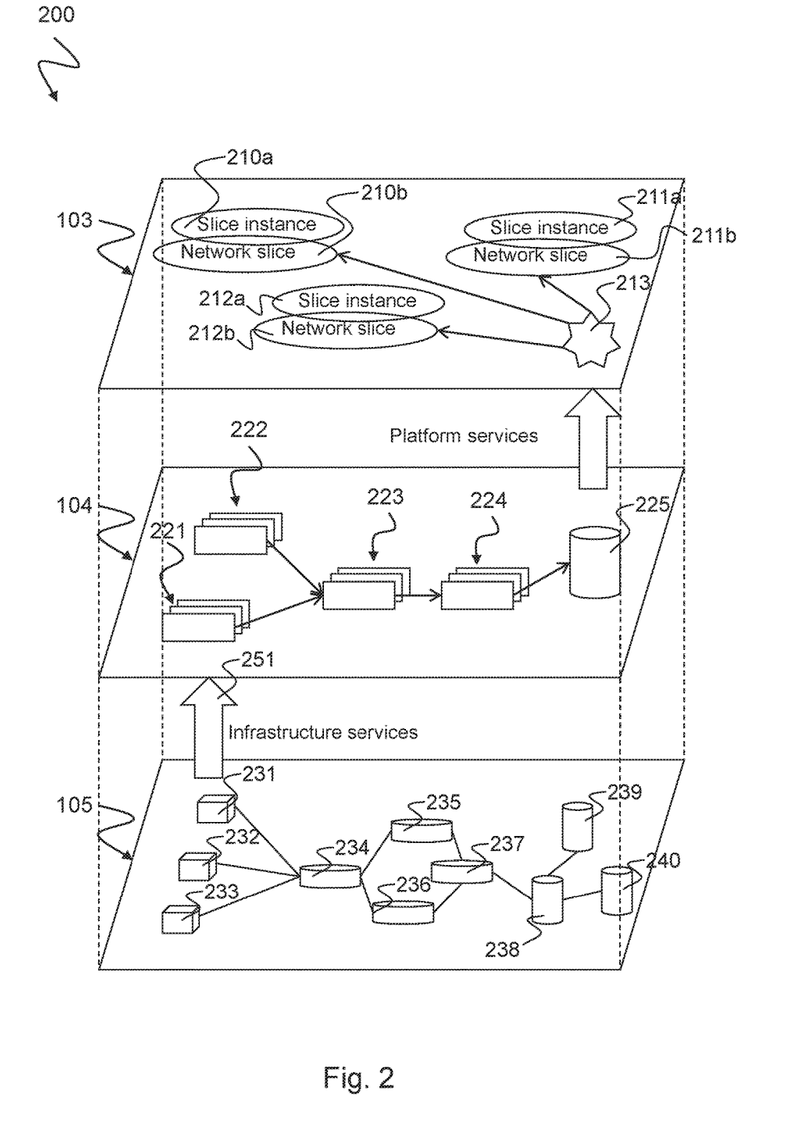
FIG. 2 depicts a scheme of a 5G communication network with multiple slices 200.

The presented devices, systems and methods are intended to improve communication in communication networks, especially in 5G communication networks with multiple network slices, as described below. FIG. 2 shows a scheme of a 5G communication network 200 with multiple network slices. The 5G communication network 200 covers an infrastructure & resource layer 105, an activation layer 104 and an application layer 103.

The infrastructure & resource layer 105 covers all physical assets attributed to a network provider, i.e. locations, cables, network nodes etc. This layer 105 constitutes the basis for all network slices. It is structured as generic as possible, without too many of specialized physical units. The infrastructure & resource layer 105 obscures any type of user specific implementation with respect to the upper layers, so that the remaining systems can be used for various slices in the best way possible. Components of the infrastructure & resource layer 105 are based on hardware and software or firmware required for the respective operation and in this process is provided as infrastructure & resource layer 105 to the above layers as a resource objects. For example, the objects of the infrastructure & resource layer 105 include virtual machines, virtual links or connections, and virtual networks, such as access nodes 231, 232, 233, virtual network nodes 234, 235, 236, 237 and virtual computer nodes 238, 239, 240. As already suggested by the concept "virtual", the infrastructure & resource layer 105 provides objects in the form of "infrastructure as a service" 251, i.e. in an abstract, virtualized form of the layer one step above 104.

The activation layer 104 is located above the infrastructure & resource layer 105. It uses the objects of the infrastructure & resource layer 105 and adds to its additional functionality in the form of (for example, non-physical) software objects/VNFs to enable creation of any type of network slices, and to provide this way a platform as a services of the layer one step higher 103.

Software objects can exist in any granularity, and cover a very large or a tiny fragment of a network slice. To permit creation of network slices at the appropriate abstraction level, various abstracted objects 221 can be combined at the activation level 104 with other abstracted objects and virtual network functions 222 in order to create combined objects 223, which can be transferred into aggregated objects 224 and provided at the next level in an object library 225. This way complexity can be hidden behind the network slices. For example, a user can generate a mobile broadband slice, and in this process only define a KPI (key performance indicator) without having to specify particular features, such as individual local antenna coverage, backhaul connections and specific parameterization grades. To support open environment and allow adding or erasing network functions on demand, an important capability of the activation layer 104 is necessary to support dynamic re-assignment of functions and connectivities in a network slice, for example, by using SFC (Service Function Chaining) or modifying software, so that the functionality of a slice can be completely predefined, and can cover both nearly static and dynamically added software modules.

A network slice can be treated as a software-defined entity based on a set of objects, which define a complete network. The activation layer 104 plays a key role in the success of this concept, since it can cover all software objects necessary to provide the network slices and the respective capacities to handle the objects. The activation layer 104 can be considered as a network operating system of sorts complemented with a network generation environment. A significant task of the activation layer 104 is defining of the respective abstraction levels. The network providers have this way sufficient room to design their network slices, while the platform operators still can maintain and optimize the physical nodes. For example, this way the performance of daily tasks, such as addition or substitution of NodeBs etc. is supported without efforts on behalf of the network customers. Defining appropriate objects, which model a complete telecommunication network, is one of the significant tasks of the activation layer 104 in developing the network slice environment.

A network slice, also referred to as 5G slice, supports the communication services of a certain connection type by dealing in a particular manner with the C (control) and U (user data) levels. A 5G slice consists of a collection of various 5G network functions and specific radio access technology (RAT) settings, which taken together are used for a specific user case. Therefore, a 5G slice can cover all network domains, such as software modules running on cloud nodes, specific configurations of the transportation network, which support flexible location of functions, a certain radio configuration or even a certain access technology, as well as configuration of the 5G devices. Not all slices contain the same functions; some functions, which appear important for a mobile network at this point, may not even exist in some slices. A 5G slice is intended to provide only those functions, which are required for the specific use case, and avoid all other unnecessary functionalities. The flexibility behind the slice concept is the key for both extension of the existing use cases and generation of the new use cases. Third party devices can thus be granted permission to control certain aspects of slicing via appropriate APIs in order to provide this way customized services.

The application layer 103 covers all the generated network slices 210b, 211b, 212b and offers them as "network as a service" to various network users, such as different customers. The concept enables re-use of the defined network slices 210b, 211b, 212b for various users, such as customers, for example, as a new network slice instance 210a, 211a, 212a. This means a network slice 210b, 211b, 212b, which is assigned, for example, to an automotive application, can also be used for applications of various other industrial applications. The slice instances 210a, 211a, 212a, which were generated by the first user, can, for example, be independent of the slice instances, which were generated by the second user, although the entire network slice functionality can be the same.

According to embodiments of the invention methods are provided for establishing a roaming connection of a communication terminal of a foreign communication network in a visited communication network, the foreign communication network and the visited communication network consisting of multiple sub-networks, and an identification entity being assigned in each sub-network of the visited communication network for identification of a communication terminal, and a sub-network identifier is assigned to each sub-network of the respective communication network, and in the visited communication network there is a network management entity, which manages assignment of sub-networks to communication devices, and the method covers the following steps: receipt of a roaming connection request from the communication terminal of the foreign communication network via the first identification entity of the first sub-network of the visited communication network, with the roaming connection request having an identity of the communication device; identification of the communication terminal by the first identification entity of the visited communication network based on identification of the communication terminal; receipt of a foreign sub-network identifier of a foreign sub-network of the foreign communication network via the first identification entity of the visited communication network; verification on the basis of the foreign sub-network identifier by the network management entity or the first identification entity whether the respective sub-network of the visited communication network corresponds to the foreign sub-network, which is shown by the foreign sub-network identifier; and sending of a configuration request for a configuration of the foreign sub-network through the first identification entity of the visited communication network to the foreign communication network, if no respective sub-network of the visited communication network corresponds to the foreign sub-network.

Due to the sub-network structure of the communication network, communication performance can be increased. In particular, it can result in higher data throughput, shorter delays, particularly high reliability, much higher connection density and a large mobility area, thus resulting in improved roaming. Along with increased performance, this method can be used to control strongly heterogeneous environments, while being able to ensure trust, identity and private sphere of the users, especially for data exchange on roaming.

According to one of the embodiments, the method further covers receipt of the configuration of the foreign sub-network by the first identification entity of the visited communication network in response to sending of the configuration request. This brings the benefit that the first identification entity has this way the configuration of the foreign sub-network, and it can configure its own sub-network accordingly, so that the communication terminal of the foreign communication network can effectively communicate in the visited network.

According to one embodiment, the method further covers verification on the basis of the received configuration by the network management entity or the first identification entity whether the respective sub-network of the visited communication network corresponds to the foreign sub-network. This brings the benefit that in case of positive verification the respective sub-network can immediately be used for communication of the communication terminal, and the communication procedure can be quickly initiated.

According to one embodiment, the method further covers configuration of a sub-network of the visited communication network according to the received configuration in order to receive the respective sub-network that corresponds to the foreign sub-network. This brings the benefit that the infrastructure can also be provided and configured in the visited communication network in such way that a communication terminal of a foreign network can communicate in it, and roaming can be performed simply and efficiently.

According to one embodiment, the configuration displays at least one function and/or topology of the foreign sub-network of the foreign communication network, and at the configuration step the function is implemented or instantiated on a hardware resource of a sub-network of the visited communication network, and/or the hardware resources of the visited communication network are interconnected according to the topology, in order to obtain a respective sub-network of the visited communication network that corresponds to the foreign sub-network. This brings the benefit that the hardware resources of the visited network can be flexibly adjusted and configured in order to be available to the communication terminal of the foreign network as communication infrastructure. This makes roaming flexible and fast.

According to one embodiment, a function is a predefined standard function of a sub-network. This brings the benefit that the implementation can be simple, i.e. it has low complexity if a standard function can be used.

According to one embodiment, the configuration displays, for example, one or several of the following functions: authentication, charging, policy, mobility management, security, codecs, compression algorithms, transcoder, multimedia resource functions, such as speech recognition, voice mail system, text to speech conversion, signaling protocol, protocol extension, protocol implementation, transmission protocol, routing function, scheduling. This brings the benefit that a large number of functions, which are already common in the existing networks, is available. The method is thus compatible with the functions of the existing networks.

According to embodiments, the method further includes establishing of a communication connection over the respective sub-network of the visited communication network. This brings the benefit that the communication terminal can communicate through the visited communication network, and thereby perform roaming in a simple way.

According to one embodiment, the method further covers provision of the respective sub-network for future communications over the visited communication network via the network management entity of the visited communication network. This brings the benefit that the visited communication network can learn and, having the knowledge previous communication operations, can faster and more efficiently perform future communication operations.

According to one embodiment, the step of receipt of the foreign sub-network identifier covers the receipt of the foreign sub-network identifier by the first identification entity, especially from the communication terminal or foreign communication network, and forwarding of foreign sub-network identifier by the first identification entity to the network management entity. This brings the benefit that the foreign sub-network can be easily identified by its sub-network identifier, so that efficient communication can be established even if there is a large number of roaming operations, especially concurrent ones, with multiple communication terminals.

According to one embodiment, the visited communication network is a fifth generation network (5G) or that of a further generation, and the sub-networks are slices of the visited communication network. This way all benefits of the 5G network structure can be implemented, such as higher radio frequencies with higher data throughput, new applications, such as Internet of Things, special capabilities, such as shorter running time, which is beyond of what 4G communication networks can provide. The communication network can offer an end-to-end system, which contains all network aspects with high degree of convergence. Furthermore, the existing access mechanisms and their possible developments can be used to the full extent.

According to one embodiment, the configuration request covers identity of the communication terminal, especially a hardware identifier of the communication terminal, such as IMSI or IMEI or eID. This brings the benefit that the communication terminal can be assigned to a sub-network on the basis of multiple identifiers, such as IMSI, IMEI, eID of a communication services, a software application or an operating system, which offers a high degree of flexibility.

Sub-networks can be assigned to various applications or services, so that the communication terminal can communicate in further dependence upon several sub-networks. The sub-networks differ from each other by different functions, services or applications.

According to one embodiment, assignment of sub-network identifiers to sub-networks is saved in a network management entity. Such architecture entails higher degree of freedom in design of the management entity. The tasks of the management entity can be flexibly distributed in the network.

The network management entity does not at the same time have to be a unit located at a particular place in the network. It can also cover 2 or more planes or slices in the communication network. The identification entity contains the sub-network identifier and some functional unit verifies whether an assignment already exists. This "some functional unit" is referred to as the "network management unit". Such network management entity can be assigned functionally in the control plane of the communication network, and can, for example, be the MME in the LTE network. To the contrary, the functionality of applying the configuration and respective configuring of slice can be located in the network management system or OOS (operations support system). The above said network management entity can, therefore, extend over two planes, i.e. the control plane and the network management system plane.

According to one embodiment, the verification of whether a respective sub-network of the visited communication network corresponds to the foreign sub-network is performed on the basis of a correspondence table with assignment of sub-network identifiers to sub-networks and/or on the basis of a function table of assignment of functions to sub-networks by the network management entity. This gives the benefit that such a correspondence table can be implemented, for example, by means of a look-up table, and the request result can be provided quickly and efficiently.

According to embodiments of the invention, network management entities are provided for establishing of a roaming connection of a communication terminal of a foreign communication network in a visited communication network, the foreign communication network and the visited communication network consisting of multiple sub-networks, and an identification entity being assigned in each sub-network of the visited communication network for identification of a communication terminal, and a sub-network identifier being assigned to each sub-network of the respective communication network, and the network management entity having the following features: a memory with assignment of sub-network identifiers to sub-networks of the visited communication network; a communication interface for receipt of a foreign sub-network identifier of the foreign communication network; and a processor designed to check, on the basis of the foreign sub-network identifier and the pre-saved sub-network identifiers, whether a respective sub-network of the visited communication network corresponds to the foreign sub-network; the communication interface being designed to send a configuration request for a configuration of a foreign sub-network to the foreign communication network if no respective sub-network of the visited communication network corresponds to the foreign sub-network.

Based on the sub-network design of the communication network, the communication performance can be increased. Using such network management entity can especially achieve increased data throughput, shorter delays, particularly high reliability, much higher connection density and a large mobility area, thus resulting in improved roaming. Along with increased performance, such network management entity can be used to control strongly heterogeneous environments. The network management entity further permits to ensure trust, identity and private sphere of the users, especially for data exchange on roaming.

Receipt of the sub-network identifier can be performed via the management entity of the visited network by the management entity of the foreign network at the control plane, while the configuration request can be sent by a management entity to a management entity in the OSS plane. This gives higher design flexibility.

According to one of the embodiments of the network management entity, the communication interface is designed to receive a configuration of a foreign sub-network in response to the sending of the configuration request, and the management entity is designed to configure, especially by means of the communication interface and the processor, a sub-network of the visited communication network according to the received configuration, in order to obtain the respective sub-network that corresponds to the foreign sub-network.

As already described above, the network management entity does not at the same time have to be a unit located at a particular place in the network. It can also cover 2 or more planes or slices in the communication network. The identification entity contains the sub-network identifier and some functional unit verifies whether an assignment already exists. This "some functional unit" is referred to as the "network management unit". Such network management entity can be assigned functionally in the control plane of the communication network, and can, for example, be the MME in the LTE network. To the contrary, the functionality of applying the configuration and respective configuring of slice can be located in the network management system or OOS (operations support system). The above said network management entity can, therefore, extend over two planes, i.e. the control plane and the network management system plane. Such architecture is associated with higher degree of freedom in design of the management entity. The tasks of the management entity can be flexibly distributed in the network.

The following detailed description refers to the attached drawings, which are a part hereof and show as illustration specific embodiments in which the invention can be implemented. It is understood that other embodiments can also be used and structural or logical changes can be made without deviating from the concept of the invention in question. Therefore, the following detailed description shall not be understood as exclusive description. It is further understood that the features of various embodiment examples described herein can be combined, unless specifically provided to the contrary.

The aspects and embodiments are described by reference to the drawings, the same reference symbols generally referring to the same elements. The following description presents for the purposes of clarity multiple specific details in order to provide deep understanding of one or several aspects of the invention. However, for a person skilled in the art it may be obvious that one or several aspects or embodiments can be implemented with a lower degree of specific details. In other cases, familiar structure and elements are presented in schematic form in order to facilitate the description of one or several aspects or embodiments. It is understood that other embodiments can also be used and structural or logical changes can be made without deviating from the concept of the invention in question.

Even if a certain feature or aspect of an embodiment is disclosed with respect to only one of many implementations, such feature or aspect can also be combined with one or several other features or aspects of other implementations, as may be desired or beneficial for the given or certain application. Furthermore, to the extent the expressions "cover", "have", "with" or other versions thereof are used either in exclusive description or claims, such expressions shall be understood inclusively, similarly to the expression "include". The expressions "tied" or "connected" can be used with derivatives thereof. It is understood that such expressions are used to state that two elements cooperate or interact with each other, regardless of whether they do or do not have direct physical or electric contact with each other. Besides, the expression "as an example" shall be understood as an example, and not as the best or optimal version. Therefore, the following description shall not be understood in restrictive sense.

Figure 3:
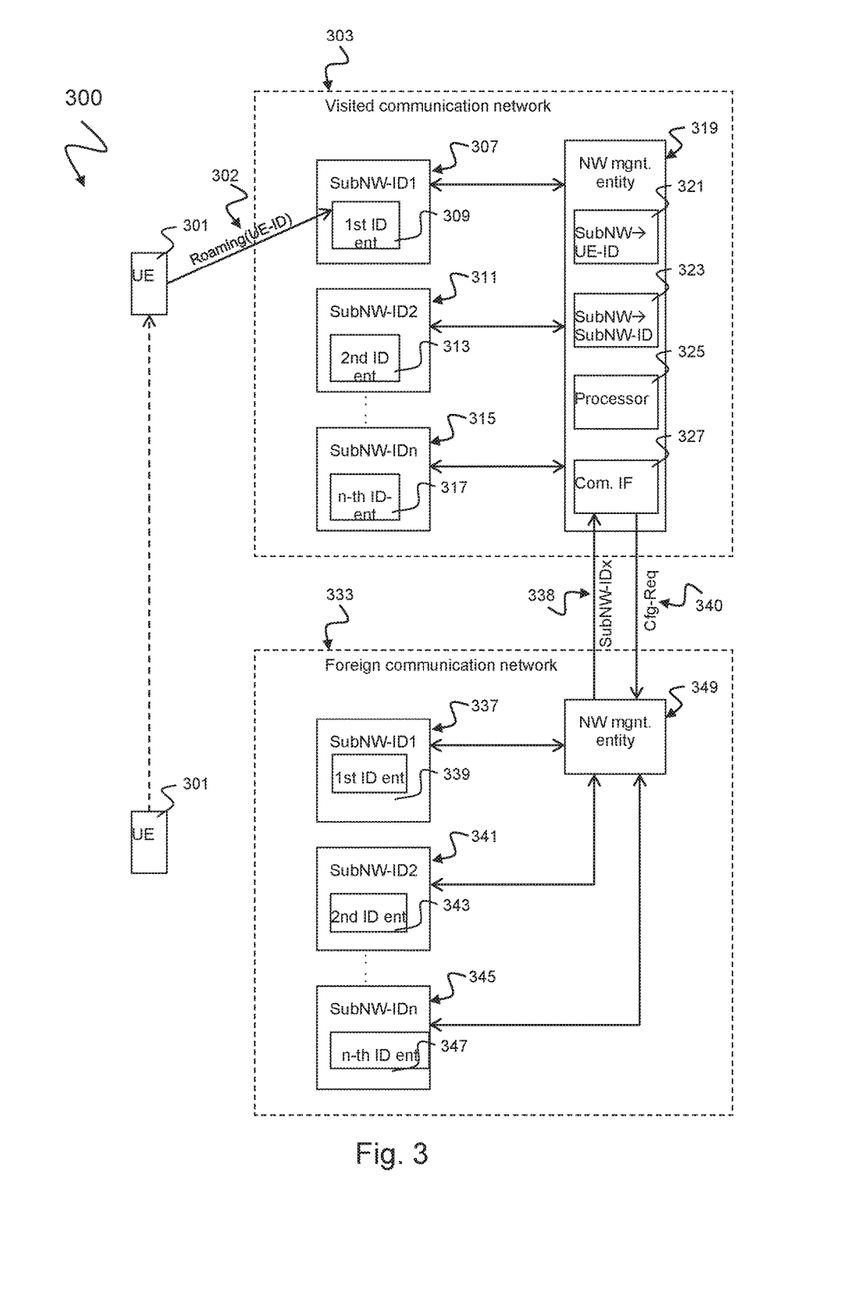
FIG. 3 depicts a scheme of a communication system 300 with a communication terminal 301 of a foreign communication network 333, a visited communication network 303 and a foreign communication network 333 according to an embodiment provided as an example.

FIG. 3 shows a scheme of a communication system 300 with a communication terminal 301 of a foreign communication network 333, a visited communication network 303 and a foreign communication network 333 according to the embodiment provided as an example. To clarify the roaming method, the communication terminal 301 of the foreign communication network 333 is located exactly in the area of the visited communication network 303 and sends a roaming request 302 to the visited communication network 303.

The visited communication network 303 covers several sub-networks 307, 311, 315 with a first sub-network 307, a second sub-network 311, and further sub-networks, for which the n-th sub-network 315 is represented as an example. These several sub-networks correspond to several slices 210b, 211b, 212b, as described above in FIGS. 1 and 2. In the first sub-network 307, there is a first identification entity 309 to which the communication terminal 301 can transmit a roaming request 302 in order to initiate a roaming procedure. In the second sub-network 311, there is a second identification entity 313, and in the further sub-networks, i.e. up to the n-th sub-network 315, there are n-th identification units 317. Alternatively, the roaming request 302 can also be transmitted to one of the other identification entities 313, 317.

A sub-network identifier SubNW-ID1, SubNW-ID2, ..., SubNW-IDn is assigned to each sub-network 307, 311, 315 of the visited communication network 303, which identifies the respective sub-network 307, 311, 315. The visited communication network 303 further includes a management entity 319, which manages assignment 321 of the communication terminal 301 with the identifier UE-ID to one of the sub-networks 307, 311, 315. In one embodiment, it only applies to own UEa, i.e. UEs of the network 303. For 301 as a participant of a foreign network (=inbound roamer), whose assignment to a SubNW is saved in its home network 333, this is only in general sense, because a SubNW-ID in the visited network 303 is saved for the SubNW-ID, which was assigned to the participant by its home network in 319. In this embodiment, it is unnecessary to have a direct assignment of UE to SubNW-ID in 319. In a further embodiment, 319 can also include other data for mapping and save assignment via UE.

The foreign communication network 333 can have the structure similar to that of the visited communication network 303. This means that the foreign communication network 333 covers a number of sub-networks 337, 341, 345 with a first sub-network 337, a second sub-network 341, and further sub-networks for which the n-th sub-network 345 is represented as an example. These several sub-networks correspond to several slices 210b, 211b, 212b, as described above in FIGS. 1 and 2. The first sub-network 307 covers a first identification entity 339, the second sub-network 341 covers a second identification entity 343, and the n-th sub-network 345 covers the n-th identification entity 347. The respective identification entities 339, 343, 347 serve identification of the communication terminal 301 that makes connection to the foreign communication network 333. Furthermore, the foreign communication network 333 covers a network management entity 349, which manages assignment of sub-networks 337, 341, 345 to communication devices.

The first identification entity 309 of the first sub-network 307 of the visited communication network 303 receives a roaming request 302 from the communication terminal 301 of the foreign communication network 333, with the roaming connection request 302 having an identity or identification UE-ID of the communication terminal 301. The first identification entity 309 identifies the communication terminal 301 on the basis of the UE-ID identification of the communication terminal 301. The first identification entity 309 receives 338 the foreign sub-network identifier SubNW-IDx of the foreign sub-network 337 of the foreign communication network 333. The network management entity 319 verifies whether a respective sub-network 307, 311, 315 of the visited communication network 303 corresponds to the foreign sub-network 337, which is identified by the foreign sub-network identifier SubNW-IDx. Alternatively, this verification can be performed by the first identification entity 309. If no respective sub-network 307, 311, 315 of the visited communication network 303 corresponds to the foreign sub-network 337, the first identification entity 309 sends a configuration request (Cfg-Req) for a configuration of the foreign sub-network 333 to the foreign communication network 333. Alternatively, the sending of the configuration request (Cfg-Req) can be performed by the network management entity 319.

The first identification entity 309 of the visited communication network 303 or alternatively the network management entity 319 receives the configuration of the foreign sub-network 337 in response to the sending 340 of the configuration request Cfg-Req.

The network management entity 319 or alternatively the first identification entity 309 verifies on the basis of the received configuration whether a respective sub-network 307, 311, 315 of the visited communication network 303 corresponds to the foreign sub-network 337, and configures a sub-network 307, 311, 315 of the visited communication network 303 according to the received configuration in order to obtain a respective sub-network 307 that corresponds to the foreign sub-network 337.

The configuration displays a function and/or topology of the foreign sub-network 337 of the foreign communication network 333. The functions can be implemented or instantiated on a hardware resource of a sub-network 307, 311, 315 of the visited communication network 303. The hardware resources of the visited communication network 303 can be interconnected according to the topology in order to obtain a respective sub-network 307 of the visited communication network 303 that corresponds to the foreign sub-network.

The function can be a pre-defined standard function of a sub-network.

The configuration can, for example, have one of the following functions: authentication, charging, policy, mobility management, security, codecs, compression algorithms, transcoder, multimedia resource functions, for example, speech recognition, voice mail system, text to speech conversion, signalization protocol, protocol extension, protocol implementation, transmission protocol, routing function, scheduling.

The visited communication network 303 can establish a communication connection via the respective sub-network 307.

The network management entity 319 of the visited communication network 303 can then also provide the respective sub-network 307 for future communications via the visited communication network 303.

The foreign sub-network identifier SubNW-IDx can be received via the first identification entity 309. The foreign sub-network identifier SubNW-IDx can be received by the communication terminal 301 or by the foreign communication network 333 and forwarded via the first identification entity 309 to the network management entity 319.

The visited communication network 303 can be a network of the fifth generation (5G) or that of a further generation. The sub-networks 307, 311, 315 can be slices of the visited communication network 303, for example, as described above in FIGS. 1 and 2.

The configuration request Cfg-Req can include the identity UE-ID of the communication terminal 301, for example, a hardware identifier of the communication terminal 301, such as IMSI or IMEI or eID.

The network management entity 319 can contain a memory 323, in order to save the assignment of the sub-network identifiers SubNW-ID to sub-networks 307, 311, 315.

The network management entity 319 does not at the same time have to be a unit located at a particular place in the visited communication network 303. It can also cover two or more planes or slices in the visited communication network 303. The identification entity 308 can contain the sub-network identifier and some functional unit can verify whether an assignment already exists. This "some functional unit" is referred to as the "network management unit" 319. Such network management entity 319 can be assigned functionally in the control plane of the visited communication network 303, and can, for example, be the MME in the LTE network. To the contrary, the functionality of applying the configuration and respective configuring of slice can be located in the network management system or OOS (operations support system). The above said network management entity 319 can, therefore, extend over two planes, i.e. the control plane and the network management system plane.

Such architecture is associated with higher degree of freedom in design of the management entity 319. The tasks of the management entity 319 can be flexibly distributed in the network.

The verification of whether a respective sub-network 307, 311, 315 of the visited communication network 303 corresponds to the foreign sub-network 337 can be performed on the basis of a correspondence table with assignment of sub-network identifiers SubNW-ID to sub-networks 307, 311, 315 and/or on the basis of a function table of assignment of functions to sub-networks 307, 311, 315 by the network management entity 319. These assignments can be saved in memory 323.

The network management entity 319 covers, along with the memory 323 with assignment of sub-network identifiers SubNW-ID to sub-networks 307, 311, 315 of the visited communication network 303, another communication interface 327 for receipt 338 of the foreign sub-network identifier SubNW-IDx of the foreign communication network 333 and a processor 325.

The processor 325 is designed to check, on the basis of the foreign sub-network identifier SubNW-IDx and the pre-saved sub-network identifiers SubNW-ID, whether a respective sub-network 307, 311, 315 of the visited communication network 303 corresponds to the foreign sub-network 337 of the foreign communication network 333.

The communication interface 327 is designed to send a configuration request Cfg-Req for a configuration of a foreign sub-network 337 to the foreign communication network 333 if no respective sub-network 307, 311, 315 of the visited communication network 303 corresponds to the foreign sub-network 337.

The communication interface 327 can receive, in response to sending 340 of the configuration receipt Cfg-Req, a configuration of the foreign sub-network 337. The network management entity 319 can, by means of the communication interface 327 and the processor 325, configure the sub-network 307 of the visited communication network 303 according to the received configuration in order to obtain a respective sub-network 307 that corresponds to the foreign sub-network 337.

With respect to the visited communication network 303, establishing of the communication can be described as follows.

The first identification entity 309 of the first sub-network 307, which can, for example, be assigned as a default sub-network by default identification entity to the communication terminal 301, receives an UI-ID identification of the communication terminal 301. Such UI-ID identification identifies the communication terminal 301. On the basis of such UI-ID identification, the first identification entity 309 identifies the communication terminal 301. The tasks of this first identification entity 309 can correspond here to those of an MME (Mobility Management Entity) in the LTE network or cover them. The identification can be performed on the basis on an IMSI or a temporary identification feature of the communication terminal 301 tied to it, for example, a UE.

Then a sub-network is assigned by the management entity 349 to the communication terminal 301. The original assignment of the sub-network takes place through the home network. For the further points, the parameters are also provided through the home network.

The tasks of the management entity 349 can correspond here to those of an HSS (Home Subscriber Server) in the LTE (Long Term Evolution) network or cover them, i.e. the following procedure establishing a connection can take place in communication network 303 with the parameters provided by the foreign communication network 333.

First, the management entity 349 provides the parameters required for authentication and, subsequently, for safety related procedures, such as encryption and protection of the message integrity. They can be a random value RAND, a key $K_{ASME}$, the expected result of the authentication verification XRES, as well as the authentication token AUTN. These 4 parameters can be sent as a so-called authentication vector by the management entity 349 to the respective sub-network 307.

RAND and AUTN can be sent by the first identification entity 309, for example, over a (not described) first communication node, for example, an eNodeB (base station) to the communication terminal 301, for example, an UE (user equipment). The first communication note can be located between the communication terminal 301 and the first sub-network 307, so as to enable communication of the communication terminal 301 with the first identification entity 309. Furthermore, the first communication node can be connected to the further sub-networks 311, 315, so as to enable communication of the communication terminal 301 with the further sub-networks 311, 315. The first communication node can be reached, for example, by the communication terminal 301 over RAT (Radio Access Technology), such as WLAN, WiFi, mobile air interface etc.

The communication terminal 301 can also derive from the secret key saved on the UICC certain parameters, such as $K_{ASME}$, which enable it to verify by means of the AUTN authenticity of the communication network 303, and calculate from RAND and $K_{ASME}$ the RES value by using a certain algorithm. This value can then be sent to the first identification entity 309, for example, through the first communication node. If RES and XRES are the same, then the first identification entity 309 sends a message to the management entity 349 to inform it that authentication of the communication terminal 301 is successfully completed. The management entity can then send a list of connections permitted for such communication terminal 301 (PDN Subscription Contexts with QoS profiles) to the first identification entity 309.

Then the first identification entity 309 can establish a default bearer (for example, an IP connection) from the communication terminal 301, for example, via a serving gateway (S-GW) to a packet data network gateway (PDN-GW), and inform the communication terminal 301 about the successful sign-on procedure.

Now the communication terminal 301 can communicate through the communication network 303. Further connection requests of PDN-GW or communication terminal 301 for additional bearers or modifications of the existing bearers can be authorized by the first identification entity 309 on the basis of the data received by the management entity 349.

The communication connection can be established through the second sub-network 311, if the sub-network identifier SubNW-ID assigned to the transmitted UE-ID identification on the basis of the foreign network management entity 349 by the network management entity 319 is the sub-network identifier SubNW-ID2 of the second sub-network 311.

Alternatively, the communication connection can be established through the n-th sub-network 315, if the sub-network identifier SubNW-ID assigned to the transmitted UE-ID identification on the basis of the foreign network management entity 349 by the network management entity 319 is the sub-network identifier SubNW-IDn of the n-th sub-network 315.

The management entity 319 can implement assignment of the sub-network identifier SubNW-ID to the communication terminal 301 on the basis on one or several of the following assignments: assignment of the UE-ID identification of the communication terminal 301, for example, hardware identifier of the communication terminal 301, such as IMSI or IMEI or eID to the sub-network identifier SubNW-ID and/or assignment of a communication service to the communication terminal 301 and/or assignment of a software application to the communication terminal 301 and/or an operating system of the communication terminal 301 and/or assignment of the SubNW-ID by the foreign network to the communication terminal 301 to one of the two sub-networks 307, 311. The home network 333 assigns to the UE its own sub-networks 337, 341, and they are mapped in the visited network 303 to the sub-networks 307, 311. The visited network can include further parameters or completely ignore this information.

Sub-networks can be assigned to various applications or services, so that the communication terminal 301 can communicate in further dependency on it through multiple sub-networks 307, 311, 315. The sub-networks can differ by various functions, services or applications.

The communication terminal 301 can transmit the identification 302 of the communication terminal 301 with respect to the first 309 or the second 313 identification entity together with the sub-network identifier SubNW-ID, which shows the sub-network 307, 311, 315 assigned to the communication terminal 301, to the first identification entity 309 or the other identification entities 313, 317. The first identification entity 309 can then transmit the UE-ID identification of the communication terminal 301 and the sub-network identifier SubNW-ID1 of the first sub-network 307 to the management entity 319. The same functionality also applies to the other identification entities 313, 317. The management entity 319 can then transmit the UE-ID identification of the communication terminal 301 and the SubNW-ID1 of the first sub-network 337 originally assigned by the foreign communication network on the basis of assignment 323. The UE receives the mapped SubNW-ID already before this step. In case of verification, the mapping should be again reversed, before the message is forwarded to the network management entity 349 of the home network 333.

When a sub-network is assigned to a communication terminal 301, the management entity 319 can transmit sub-network identifier assigned to the identification 302 of the communication terminal 301 to the first identification entity 309. If the sub-network identifier SubNW-ID assigned to the UE-ID identification of the communication terminal 301 and the sub-network identifier SubNW-ID1 of the first sub-network 307 are different, the first identification entity 309 can send the transmitted sub-network identifier SubNW-ID to the communication terminal 301. If the sub-network identifier SubNW-ID assigned to the UE-ID identification of the communication terminal 301 and the sub-network identifier SubNW-ID1 of the first sub-network 307 are different, the first identification entity 309 can send the transmitted sub-network identifier SubNW-ID to the second identification entity 313.

When the communication connection is established via the second sub-network 311, the communication terminal 301 can transmit the UE-ID identification to the second identification entity 313.

The communication connection via the first sub-network 307 can be established through the first identification entity 309; the communication connection via the second sub-network 311 can be established through the second identification entity 313. The communication connection via the n-th sub-network 315 can be established via the n-th identification entity 317. Alternatively, these communication connections can also be established by means of the communication terminal 301.

Figure 4:
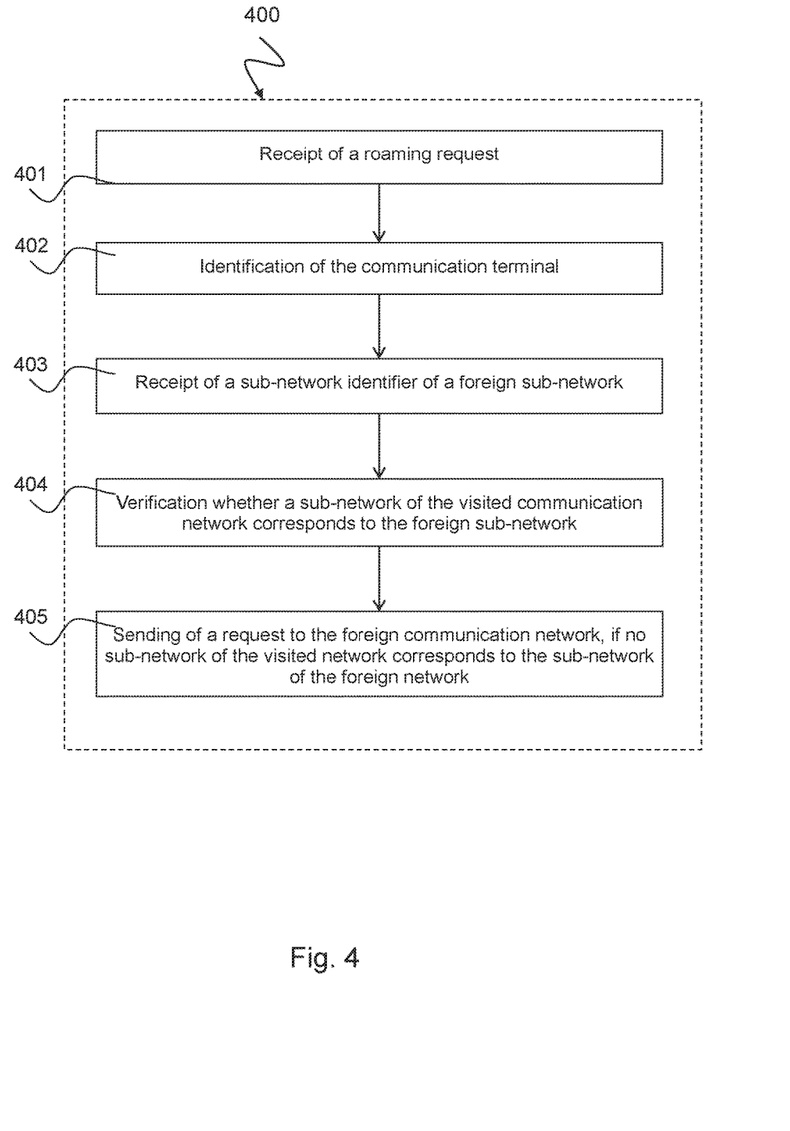
FIG. 4 depicts a scheme of a method 400 to establish a roaming connection of a communication terminal of a foreign communication network in a visited communication network according to an embodiment provided as an example.

FIG. 4 shows a scheme of a method 400 to establish a roaming connection of a communication terminal 301 of a foreign communication network 333 in a visited communication network 303 according to the embodiment provided as an example.

The visited communication network 303 can correspond to the visited communication network 303 described above in FIG. 3. This means that the visited communication network 303 covers several sub-networks 307, 311, 315 with a first sub-network 307 and a second sub-network 311. In the first sub-network 307, there is the first identification entity 309 for identification of the communication terminal 301, and in the second sub-network 311 there is the second identification entity 313 for identification of the communication terminal 301. A sub-network identifier is assigned to each sub-network 307, 311, 315 of the visited communication network 303. In the visited communication network 303 there is a network management entity 319, which manages assignment 321 of the communication terminal 301 to one of the sub-networks 307, 311, 315.

In a similar manner, the foreign communication network 333 can correspond to the foreign communication network 333 described above in FIG. 3.

The method 400 covers receipt 401 of a roaming connection request 302 from the communication terminal 301 of the foreign communication network 333 through a first identification entity 309 of a first sub-network 307 of the visited communication network 303, the roaming connection request 302 having the UE-ID identity of the communication terminal 301.

The method 400 further covers the identification 402 of the communication terminal 301 by the first identification entity 309 of the visited communication network 303 on the basis of the UE-ID identification of the communication terminal 301.

The method 400 further covers the receipt 403, 338 of a foreign sub-network identifier SubNW-IDx of a foreign sub-network 337 of the foreign communication network 333 by the first identification entity 309 of the visited communication network 303.

The method 400 further covers the verification on the basis 404 of the foreign sub-network identifier SubNW-IDx by the network management entity 319 or by the first identification entity 309 whether a respective sub-network 307, 311, 315 of the visited communication network 303 corresponds to the foreign sub-network 337, which is shown by the foreign sub-network identifier SubNW-IDx.

The method 400 further covers the sending 405, 340 of a configuration request (Cfg-Req) for a configuration of the foreign sub-network 333 by the first identification entity 309 or by the network management entity 319 of the visited communication network 303 to the foreign communication network 333, if no respective sub-network 307, 311, 315 of the visited communication network 303 corresponds to the foreign sub-network 337.

The method 400 can further cover the receipt of the configuration of the foreign sub-network 337 by the first identification entity 309 of the visited communication network 303 in response to the sending 340 of the configuration request (Cfg-Req).

The method 400 can further cover: verification on the basis of the received configuration by the network management entity 319 or by the first identification entity 309 whether a respective sub-network 307, 311, 315 of the visited communication network 303 corresponds to the foreign sub-network 337.

The method 400 can further cover: configuration of a sub-network 307, 311, 315 of the visited communication network 303 according to the received configuration in order to receive a respective sub-network 307 that corresponds to the foreign sub-network 337.

The configuration can display a function and/or topology of the foreign sub-network 337 of the foreign communication network 333. For configuration purposes, the function can be implemented or instantiated on a hardware resource of a sub-network 307, 311, 315 of the visited communication network 303. The hardware resources of the visited communication network 303 can be interconnected according to the topology in order to obtain a respective sub-network 307 of the visited communication network 303 that corresponds to the foreign sub-network 337. The function can be a pre-defined standard function of a sub-network.

The configuration can, for example, have one of the following functions: authentication, charging, policy, mobility management, security, codecs, compression algorithms, transcoder, multimedia resource functions, for example, speech recognition, voice mail system, text to speech conversion, signalization protocol, protocol extension, protocol implementation, transmission protocol, routing function, scheduling.

The method 400 can further cover: establishing of a communication connection via the respective sub-network 307 of the visited communication network 303.

The method 400 can further cover: provision of the respective sub-network 307 for further communications via the visited communication network 303 by the network management entity 319 of the visited communication network 303.

The step of receipt 338 of the foreign sub-network identifier SubNW-IDx can cover the receipt 338 of the foreign sub-network identifier SubNW-IDx by the first identification entity 309, especially by the communication terminal 301 or by the foreign communication network 333, and further cover the forwarding of the foreign sub-network identifier SubNW-IDx by the first identification entity 309 to the network management entity 319.

The visited communication network 303 can be a network of the fifth generation (5G) or that of a further generation. The sub-networks 307, 311, 315 can be slices of the visited communication network 303, for example, as described above in FIGS. 1 and 2.

The configuration request Cfg-Req can include the identity UE-ID of the communication terminal 301, for example, a hardware identifier of the communication terminal 301, such as IMSI or IMEI or eID.

The assignment of the sub-network identifiers SubNW-ID to sub-networks 307, 311, 315 can be saved in the network management entity 319.

As described above in FIG. 3, the network management entity 319 does not at the same time have to be a unit located at a particular place in the visited communication network 303. It can also cover two or more planes or slices in the visited communication network 303. The identification entity 308 can contain the sub-network identifier and some functional unit can verify whether an assignment already exists. This "some functional unit" is referred to as the "network management unit" 319. Such network management entity 319 can be assigned functionally in the control plane of the visited communication network 303, and can, for example, be the MME in the LTE network. To the contrary, the functionality of applying the configuration and respective configuring of slice can be located in the network management system or OSS (operations support system). The above said network management entity 319 can, therefore, extend over two planes, i.e. the control plane and the network management system plane. Such architecture is associated with higher degree of freedom in design of the management entity 319. The tasks of the management entity 319 can be flexibly distributed in the network.

The verification of whether a respective sub-network 307, 311, 315 of the visited communication network 303 corresponds to the foreign sub-network 337 can be performed on the basis of a correspondence table with assignment of sub-network identifiers SubNW-ID to sub-networks 307, 311, 315 and/or on the basis of a function table of assignment of functions to sub-networks 307, 311, 315 by the network management entity 319.

The assignment of UE to SubNW-ID can take place using the assignment from the home network and thus represent a generalized case of mapping.

Figure 5:
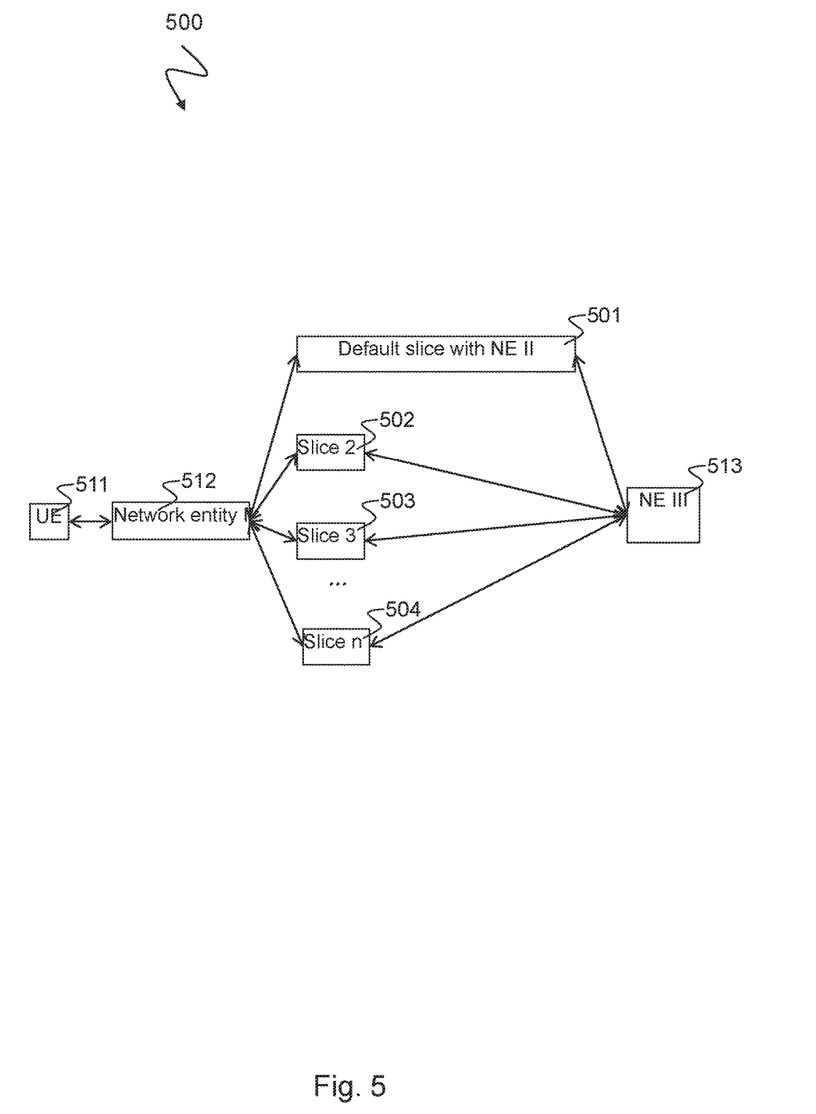
FIG. 5 depicts a scheme of a sign-on procedure of a communication terminal on the example of a 5G network 500 according to an embodiment provided as an example.

FIG. 5 shows a scheme of the sign-on procedure of a communication terminal into a communication network on the example of a 5G network 500 according to an embodiment provided as an example. The 5G network 500 covers a UE 511, a first network entity 512 or a network entity, a number of slices 501, 502, 503, 504 to which a second network entity is assigned, respectively, and a third network entity 513. The UE (user equipment) is an example of a communication terminal 301 described above in FIGS. 3 and 4. The first network entity 512 can correspond to the communication note described above in FIG. 3. It can be, for example, an eNodeB or a base station. The slices 501, 502, 503, 504 can correspond to the sub-networks 307, 311, 315 described above in FIGS. 3 and 4 or to the network slices 210b, 211b, 212b described in FIG. 2 or to the instances 210a, 211a, 212a of these network slices. The first slice 501 is described here as an example as a default slice. Naturally, any other of the slices 502, 503, 504 can be specified as a default slice. The third network entity 513 can correspond to the network entity 319 described above in FIGS. 3 and 4. It can be, for example, assigned to the management & instrumentation layer 106 described in FIG. 1. The third network entity 513 can, in particular, also perform the tasks of an HSS according to the LTE terminology. The respective second network entities, which are assigned to the slices 501, 502, 503, 504, can, in particular, also perform the tasks of an MME according to the LTE terminology.

In one of the embodiments, the structure of the 5G network 500 is similar to the structure of an LTE network. However, the home network has multiple sub-networks 501, 502, 503, 504, which can be called slices. Therefore, the UE is assigned not only to the home network (through the third network entity 513, comparable to the HSS), but also to the respective slice. The second network entities can, by analogy with an MME according to the LTE terminology, be at the same time part of the default slice 501, which depends upon the exact function. The sub-networks 501, 502, 503, 504 can then have a respective connection to the third network entity 513 by analogy to the HSS according to the LTE, as shown here in FIG. 5.

An example of the sign-on procedure into the 5G network 500 is described below.

The UE 511 connects via the first network entity 512 with the second network entity of the default slice 501. The second network entity of the default slice 501 identifies the UE 511 based on the IMSI or a temporary identification feature tied to it and forwards the request of the UE 511 about sign-on into the network to the third network entity 513.

First, the third network entity 513 produces the parameters, which are required for authentication and, subsequently, for safety related procedures, such as encryption and protection of the message integrity. They can be a random value RAND, a key $K_{ASME}$, the expected result of the authentication verification XRES, as well as the authentication token AUTN. These 4 parameters can be sent as a so-called authentication vector by third network 513 to the second network entity of the default slice 501. RAND and AUTN are sent by the second network entity of the default slice 501 over the first network entity 512 to the UE 511. The UE 511 can also derive from the secret key saved on the UICC certain parameters, such as $K_{ASME}$, which enable it to verify by means of the AUTN authenticity of the network, and calculate from RAND and $K_{ASME}$ the RES value by using a certain algorithm. This value can then be sent to the first network entity 512 to the second network entity of the default slice 501. If RES and XRES are equal, then the second network entity of the default slice 501 sends a message to the third network entity 513 to inform it that the authentication of the UE 511 was successfully completed. Then the third network entity 513 sends a list of connections allowed for this UE 511, such as PDN (Packet Data Network) Subscription Contexts with QoS (Quality of Service) profiles to the second network entity of the default slice 501.

Then the second network entity of the default slice 501 establishes a default bearer (for example, an IP connection) from UE 511, for example, to a PDN-GW via, for example, an S-GW, and informs the UE 511 about the successful sign-on procedure. Now the UE 511 can communicate through the communication network. Further connection requests of PDN-GW or UE 511 for additional bearers or modifications of the existing bearers can be authorized by the second network entity of the default slice 501 on the basis of the data received by the third network entity 513.

All sub-networks (slices) 501, 502, 503, 504 are predefined with respect to both the sub-network structure (i.e. which functionalities are available, which network topology is defined) and functionality.

The network entities II (on default slice 501) and III 513 are assigned to the control plane. The network entity I 512 is assigned to both the control plane and user plane, for example, signalization between network entity I 512 and network entity II (on default slice 501) can run on the control plane (CP), while the user data between network entity I 512 and S-GW and PDN-GW can run on the user plane (UP). The sub-networks 501, 502, 503, 504 logical run together in the network entity III 513. There are different possibilities for the network entity II: If the scope of the functions is similar to the MME according to the LTE terminology, then the network entity II is a part of the default slice 501, as shown in FIG. 5. In any case, there is the following 2-stage process:

a) The UE 511 tries to sign on, is fully authenticated as described above by the network entities II and III 513, and is either assigned to a different slice or is left in the default slice 501. This default slice 501 can be in one of the embodiments a standard multimedia broadband network.

b) If the UE 511 is assigned to a different slice, the network entity I 512 repeats the sign-on procedure in the direction of the assigned slice (and the network entity II in it), and if the procedure is successful, the UE 511 is signed off from the default slice 501.

This can correspond in terms of procedure, for example, to a tracking area update according to the LTE terminology, i.e. to the procedure that is performed when the UE 511 comes from the area of one MME/S-GW into the area of another MME/S-GW, while the network entity I 512 can, to the contrary, choose another network entity II (where the eNodeB of a network is only connected to one MME) based on the sub-network identifier.

In one of the implementation forms, authentication of the UE 511 can take place is a) or b) or in a) and b). This can be performed similarly to the above described tracking area update.

In one of the implementation forms, the network entity II only has the functionality that is required to determine the slice with the network entity III 513. In such case, it is not a part of the default slice, and step b) always takes place.

The network entity III 513 identifies based on, for example, the IMSI the UE 511 and assigns to the UE 511 the respective slice, for example, sub-network I 501. The assignment of the slice takes place based on the data saved in the network entity III and possibly using the parameters, which are transmitted to the network II during the sign-on of the UE 511. They can be hardware identifiers (such as the IMEI), operating system infos or application IDs.

In an alternative version, the UE 511 transmits the identifier of the respective sub-network at the second step b). This is the identifier, which it received during the first step a) from the network entity III through the network entity II. Then the UE 511 repeats during the step b) the sign-on procedure in the direction of the assigned slice. This means that in this alternative the slices run together in the UE 511, and not in the network entity I 512.

In this alternative version, the UE 511 can release, instead of its own ID (such as IMSI), its own ID with the slice ID for each while establishing each communication. This always results in the correct choice of the network entity II, the network entity I 512 does not have to save any status for the UE 511, and the UE 511 can also be a part of multiple slices. This also simplifies the procedures in case of change of the network entity I 512.

In a further alternative version, the UE 511 transmits the sub-network identifier from the very beginning. The sub-network can, for example, contain one S-GW (analogy), one PDN-GW (analogy) etc. These networks are parameterized for the UE 511. This takes place through the network entity II, when needed—for example, when a new bearer is created.

Upon successful assignment of the slice and sign-on in it, the network entity II, which services as the first contact point for the sign-on, is no longer tied into the signalization flow (except that the UE 511 remains in the default slice 501 and the network entity II is a part of the default slice 501).

Following the parameterization, the UE 511 can communication through the sub-network I 501, for example, on the internet, or get registered in the IMS and use the telecommunication services (such as telephone).

The sub-networks I through n 501, 502, 503, 504 are separated from each other.

The above concept applies analogously to sign-up into a foreign network. Here the network entity III analogously takes over the choice of the sub-networks and parameters. In the foreign network, the network entity II will choose in the visited network the pre-determined sub-network of the foreign network that corresponds to the home network (for example, from the look-up table).

Embodiments of the invention also include the software product that can be loaded directly into the internal memory of a digital computer and covers the software code sections with which the procedure 400 described in FIG. 4 or the procedures described in FIGS. 3 and 5 can be performed when the product runs on a computer. The software product can be saved on a non-transitory medium of the computer and cover the computer readable programs that make the computer run the procedure 400 or implement and control the network components of the communication networks described in the FIGS. 1 through 5.

The computer can be a PC, for example, a PC of a computer network. The computer can be implemented as a chip, an ASIC, a microprocessor or a signal processor and be assigned to a computer network, for example, to a communication network described in FIGS. 1 through 5.

It is self-explanatory that the features of various embodiments provided here as an example can also be combined with each other, unless specifically stated to the contrary. As explained in the description and on the drawings, specific elements shown as connected to each other must not be directly connected to each other; there can be intermediate elements between the connected elements. Furthermore, it is self-explanatory that embodiments of the invention can be implemented in individual circuits, partially integrated circuits or fully integrated circuits or program means. The expression "as an example" shall be understood merely as an example, and not as the best or optimal version. This document describes and illustrates specific embodiments, but for a person skilled in the art it is obvious that a number of alternatives and/or similar implementations can be used instead of the embodiments shown and described embodiments without deviating from the concept of the invention in question.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

100: 5G system architecture
101: access device, communication terminal, UE
102: access technology
103: application layer
104: activation layer
105: infrastructure & resource layer
106: management & instrumentation layer
200: 5G communication network with multiple slices
210*a*: first slice instance
210*b*: first network slice
211*a*: second slice instance
211*b*: second network slice
212*a*: third slice instance
212*b*: third network slice
213: slice composition
221: abstracted objects
222: virtual network functions
223: combined objects
224: aggregated objects
225: object library
231: access node
232: access node
233: access node
234: virtual network node
235: virtual network node
236: virtual network node
237: virtual network node
238: computer node
239: computer node
240: computer node
251: infrastructure services
300: communication system
301: communication terminal, for example, UE
302: roaming request with identification of the communication terminal
303: visited communication network
307: 1st sub-network
309: 1st identification entity
311: 2nd sub-network
313: 2nd identification entity
315: n-th sub-network
319: management entity
321: assignment of sub-network identifier to ID of the communication terminal
323: assignment of sub-network to sub-network identifier
325: processor
327: communication interface
333: foreign communication network
337: 1st sub-network of the foreign network
339: 1st identification entity of the foreign network
341: 2nd sub-network of the foreign network 343: 2nd identification entity of the foreign network
345: nth sub-network of the foreign network
349: management entity of the foreign network
338: message with sub-network identifier of the foreign network
340: configuration request for configuration of the foreign network
400: method for establishing of a roaming connection
401: first step: receipt
402: second step: identification
403: third step: receipt
404: fourth step: verification
405: fifth step: sending
500: 5G communication network
501: default slice with network entity II or second network entity
502: slice 2
503: slice 3
504: slice n
511: UE or communication terminal
512: first network entity or network entity I
513: third network entity or network entity III

The invention claimed is:

1. A method to establish a roaming connection of a communication terminal of a foreign communication network in a visited communication network, the foreign communication network and the visited communication network each comprising multiple sub-networks, wherein an identification entity is assigned in each sub-network of the visited communication network for identification of a communication terminal, wherein a sub-network identifier is assigned to each sub-network of the respective communication network, and wherein, in the visited communication network, there is a network management entity which manages assignment of sub-networks to communication devices, the method comprising:
   receiving, by a first identification entity of a first sub-network of the visited communication network, a roaming connection request from the communication terminal of the foreign communication network, the roaming connection request having an identifier of the communication terminal of the foreign communication network;
   identifying, by the first identification entity, the communication terminal of the foreign communication network based on the identifier of the communication terminal of the foreign communication network;
   receiving, by the first identification entity, a foreign sub-network identifier of a foreign sub-network of the foreign communication network;
   verifying, by the network management entity or the first identification entity, based on the foreign sub-network identifier, whether a respective sub-network of the visited communication network corresponds to the foreign sub-network; and
   sending, by the first identification entity or the network management entity, a configuration request for a configuration of the foreign sub-network to the foreign communication network in response to no respective sub-network of the visited communication network corresponding to the foreign sub-network.

2. The method according to claim 1, further comprising:
   receiving, by the first identification entity or the network management entity, the configuration of the foreign sub-network in response to the sending of the configuration request.

3. The method according to claim 2, further comprising:
   verifying, by the network management entity or the first identification entity, based on the received configuration, whether a respective sub-network of the visited communication network corresponds to the foreign sub-network.

4. The method according to claim 2, further comprising:
   configuring a sub-network of the visited communication network according to the received configuration in order to receive a respective sub-network that corresponds to the foreign sub-network.

5. The method according to claim 4, wherein the configuration displays at least one function and/or topology of the foreign sub-network of the foreign communication network, and wherein at the configuration step the at least one function is implemented or instantiated on a hardware resource of a sub-network of the visited communication network, and/or wherein hardware resources of the visited communication network are interconnected according to the topology in order to obtain a respective sub-network of the visited communication network that corresponds to the foreign sub-network.

6. The method according to claim 5, wherein the at least one function comprises at least one predefined standard function of a sub-network.

7. The method according to claim 5, wherein the configuration displays at least one of the following functions: authentication, charging, policy, mobility management, security, codecs, compression algorithms, transcoder, or multimedia resource functions.

8. The method according to claim 1, further comprising:
   establishing a communication connection over the respective sub-network of the visited communication network.

9. The method according to claim 1, further comprising:
   provisioning, by the network management entity, the respective sub-network for future communications over the visited communication network.

10. The method according to claim 1, wherein receiving the foreign sub-network identifier includes receipt of the foreign sub-network identifier by the first identification entity from the communication terminal of the foreign communication network or from the foreign communication network, and forwarding of the foreign sub-network identifier (SubNW-IDx) by the first identification entity to the network management entity.

11. The method according to claim 1, wherein the visited communication network is a fifth generation network or that of a further generation, and wherein the sub-networks are slices of the visited communication network.

12. The method according to claim 1, wherein the configuration request includes the identifier of the communication terminal of the foreign communication network.

13. The method according to claim 1, wherein assignment of sub-network identifiers to sub-networks is saved in the network management entity.

14. The method according to claim 1, wherein verifying whether a respective sub-network of the visited communication network corresponds to the foreign sub-network is performed based on a correspondence table with assignment of sub-network identifiers to sub-networks and/or based on a function table of assignment of functions to sub-networks by the network management entity.

15. A network management entity of a visited communication network for establishing of a roaming connection of a communication terminal of a foreign communication network in the visited communication network, the foreign communication network and the visited communication network comprising multiple sub-networks, wherein an identification entity is assigned in each sub-network of the visited communication network for identification of a communication terminal, and wherein a sub-network identifier is assigned to each sub-network of the respective communication network, the network management entity comprising:
- a memory configured to store assignments of sub-network identifiers to sub-networks of the visited communication network;
- a communication interface configured to receive a foreign sub-network identifier of the foreign communication network; and
- a processor configured to check, based on the foreign sub-network identifier and the sub-network identifiers, whether a respective sub-network of the visited communication network corresponds to a sub-network of the foreign communication network;
- wherein the communication interface is further configured to, in case of no respective sub-network of the visited communication network corresponding to the foreign sub-network, send a configuration request for a configuration of a foreign sub-network to the foreign communication network.

16. The network management entity according to claim 15, wherein the communication interface is further configured to receive a configuration of the foreign sub-network in response to the sending of the configuration request, and the network management entity is configured to configure a sub-network of the visited communication network according to the received configuration, in order to obtain the respective sub-network that corresponds to the foreign sub-network.

17. The network management entity according to claim 15, wherein the sub-networks of the visited communication network correspond to slices of a 5G communication network.

* * * * *